Aug. 29, 1961 A. R. MAXEY 2,998,495

RECORDING AND REPRODUCING HIGH FREQUENCIES TRANSVERSELY ON A MAGNETIC TAPE

Filed March 26, 1958 5 Sheets-Sheet 1

INVENTOR.
Alexander R. Maxey
BY Fleher & Swain
ATTORNEYS

Aug. 29, 1961 A. R. MAXEY 2,998,495

RECORDING AND REPRODUCING HIGH FREQUENCIES
TRANSVERSELY ON A MAGNETIC TAPE

Filed March 26, 1958 5 Sheets-Sheet 2

INVENTOR.
Alexander R. Maxey
BY
Fliehr & Swain
ATTORNEYS

Aug. 29, 1961 A. R. MAXEY 2,998,495

RECORDING AND REPRODUCING HIGH FREQUENCIES TRANSVERSELY ON A MAGNETIC TAPE

Filed March 26, 1958 5 Sheets-Sheet 3

INVENTOR.
Alexander R. Maxey
BY Flehr & Swain
ATTORNEYS

Aug. 29, 1961 A. R. MAXEY 2,998,495

RECORDING AND REPRODUCING HIGH FREQUENCIES TRANSVERSELY ON A MAGNETIC TAPE

Filed March 26, 1958 5 Sheets-Sheet 4

INVENTOR.
Alexander R. Maxey

BY

ATTORNEYS

INVENTOR.
Alexander R. Maxey
BY
Fehr & Swain
ATTORNEYS 2,998,495
Patented Aug. 29, 1961

2,998,495

RECORDING AND REPRODUCING HIGH FREQUENCIES TRANSVERSELY ON A MAGNETIC TAPE

Alexander Rainey Maxey, San Mateo, Calif., assignor to Ampex Corporation, Redwood City, Calif., a corporation of California Filed Mar. 26, 1958, Ser. No. 724,123
5 Claims. (Cl. 179—100.2)

This invention relates generally to apparatus and methods for recording and/or reproducing signals over a broad frequency spectrum. More particularly it pertains to apparatus and methods of this character employing a pliable magnetic tape formed of a plastic film control with a magnetic oxide or like magnetic material.

In copending application, Serial No. 524,004, filed July 25, 1955, for broad band magnetic tape system and method, there is disclosed a system making use of a rotary head assembly for recording and/or reproducing signals over a wide frequency spectrum. One practical use for such a system is the recording and reproduction of television programs. The head assembly disclosed in said application comprises a plurality of transducer units that are mounted to rotate and sweep transversely across a magnetic tape. Speed control means is employed for driving the head assembly and the magnetic tape during recording, and to insure accurate tracking and synchronization for playback operations. Each sweep of a transducer unit across the tape forms a track portion of the recorded composite signal. During playback successive track portions are reproduced and combined to form a continuous signal. Electronic switching means are employed whereby portions of the record tracks near the edges of the tape are effectively eliminated in reproducing the final composite signal. Reproduction of a plurality of portions is required to complete a picture frame.

In my copending application Serial No.561,053, filed January 24, 1956, for Magnetic Tape Apparatus, there is disclosed apparatus in which a relatively wide pliable tape is bent to cylindrical form, and swept by a single transducer head. Such apparatus does not require the use of electronic switching means.

In general, it is an object of the present invention to provide an apparatus and method suitable for recording and/or reproducing signal intelligence over a wide frequency spectrum, which permits the use of a single rotating transducer head without using a tape of excessive width.

Another object of the invention is to provide an apparatus and method of the above character which permits recording on relatively long track portions, whereby all of the horizontal sweep lines for one picture field, or even for one picture, can be placed upon a single track portion.

Another object of the invention is to provide novel means in a machine of the above character for controlling operating contact between the transducer unit and the tape.

Another object of the invention is to provide a machine of the above character having guide means formed in such a manner as to maintain accurate tracking and to enable movement of the tape with a minimum amount of friction.

Additional objects and features of the invention will appear from the following description in which the preferred embodiments have been shown in detail in conjunction with the accompanying drawing.

Referring to the drawing.

In accordance with the present invention I provide inner guides providing cylindrical peripheral surfaces about which the magnetic tape is wrapped helicoidally. A rectilinear area of the tape is exposed by an annular gap between two axially spaced guides, and this area is swept by a transducer head operating within the slot. Capstan drive means is employed to move the tape in the direction of its length between tape supply and takeup reels. Air flotation means is utilized with respect to the guides to reduce rubbing friction to a minimum. An outer or female guide surrounds the coiled portion of the tape and serves during operation to support the tape against the pressure applied by the rotating transducer head. Selectively operated means is provided in connection with the guides for causing the tape either to be held out of contact with the head, or contacted therewith for normal recording and/or playback.

Figure 1:
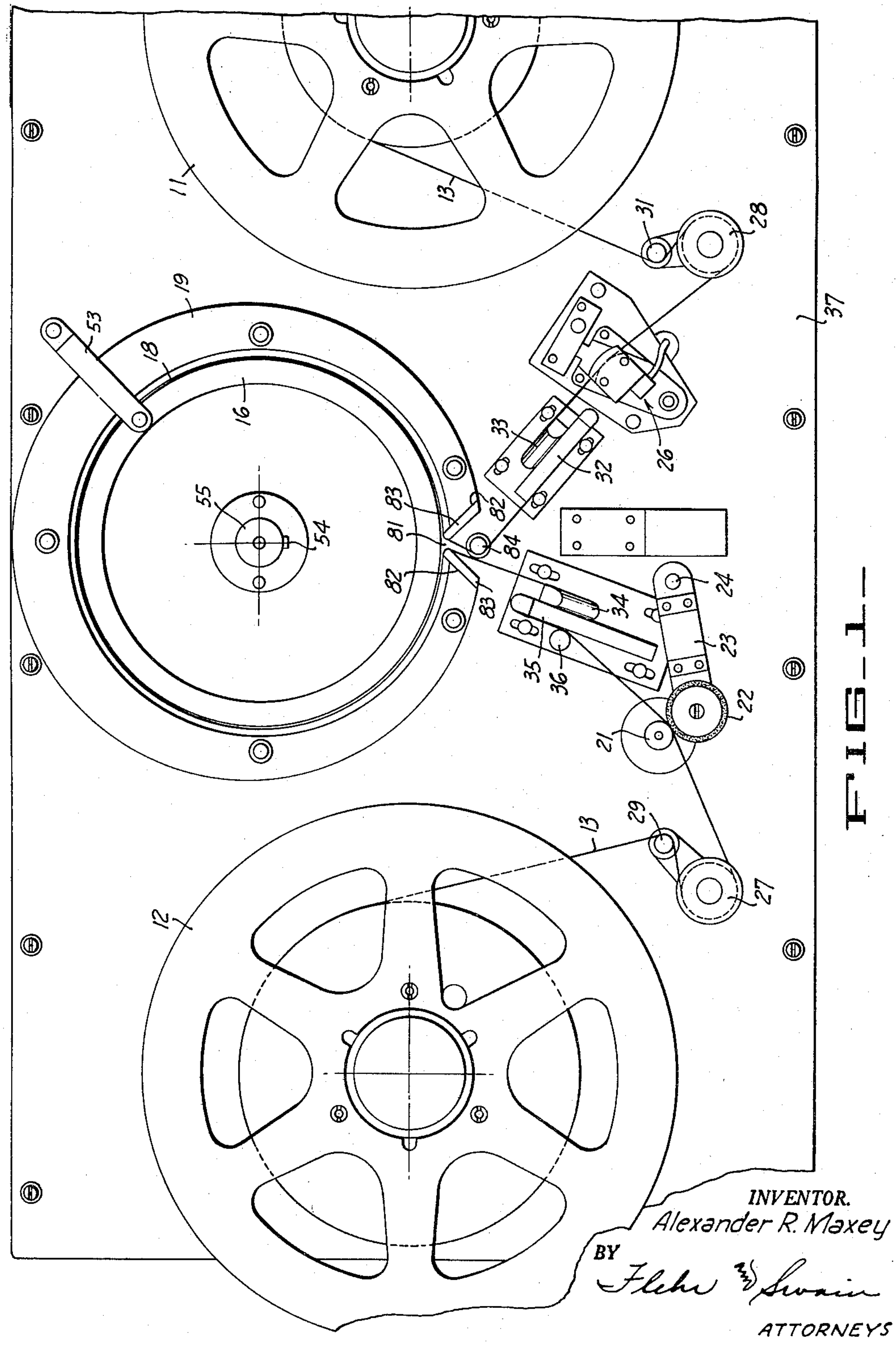
FIGURE 1 is a plan view illustrating a magnetic tape machine incorporating the present invention.

The apparatus illustrated in FIGURE 1 consists of supply and takeup reels 11 and 12, which are mounted upon suitable turntables (not shown), and serve to store the magnetic tape 13. These turntables are mechanically connected to electric motors (not shown) such as are commonly employed with the tape turntables of magnetic tape machines. According to customary practice with conventional magnetic tape recorders, these motors are energized during normal operation to maintain tape tension and to wind up the tape on the takeup reel. Also they may be energized for fast forward or reverse rewind operations. The length of the magnetic tape extending between the reels is wrapped helicoidally about guide means formed by the inner guides 14 and 16. These guides have cylindrical peripheral surfaces 17 and 18 which are in axial alinement and of like diameter. The coiled portion of the tape is also embraced by the outer guide 19.

The means employed for driving the tape in the direction of its length includes the capstan 21, connected to a suitable driving motor (not shown). The tape is pressed against the driving capstan by the rollers 22 that are carried by the free end of the tape clamp arm 23. This arm is carried by the operating shaft 24, which is actuated either to release or clamp the tape for driving. The tape is shown engaging a stationary transducer head assembly 26 for recording and/or reproducing on one or more record tracks extending longitudinally of the tape. Such tracks can be along the tape margins as will be presently explained.

Additional guide means for the tape may include the flanged rollers 27 and 28, which carry the associated spring urged tape tension arms 29 and 31. One set of guide studs 32 and 33 direct the tape over stud 84 to the inner guides 14 and 16 and another set of studs 34, 35, and 36 direct the tape as it leaves the inner guides, and as it advances to the capstan 21. These guide studs are disposed at angles such that the guide rollers 27 and 28, and the supply and takeup reels 11 and 12, may be located in a common plane.

All of the operating parts described above are shown mounted upon the plate or panel 37.

Figures 2, 13, 14:
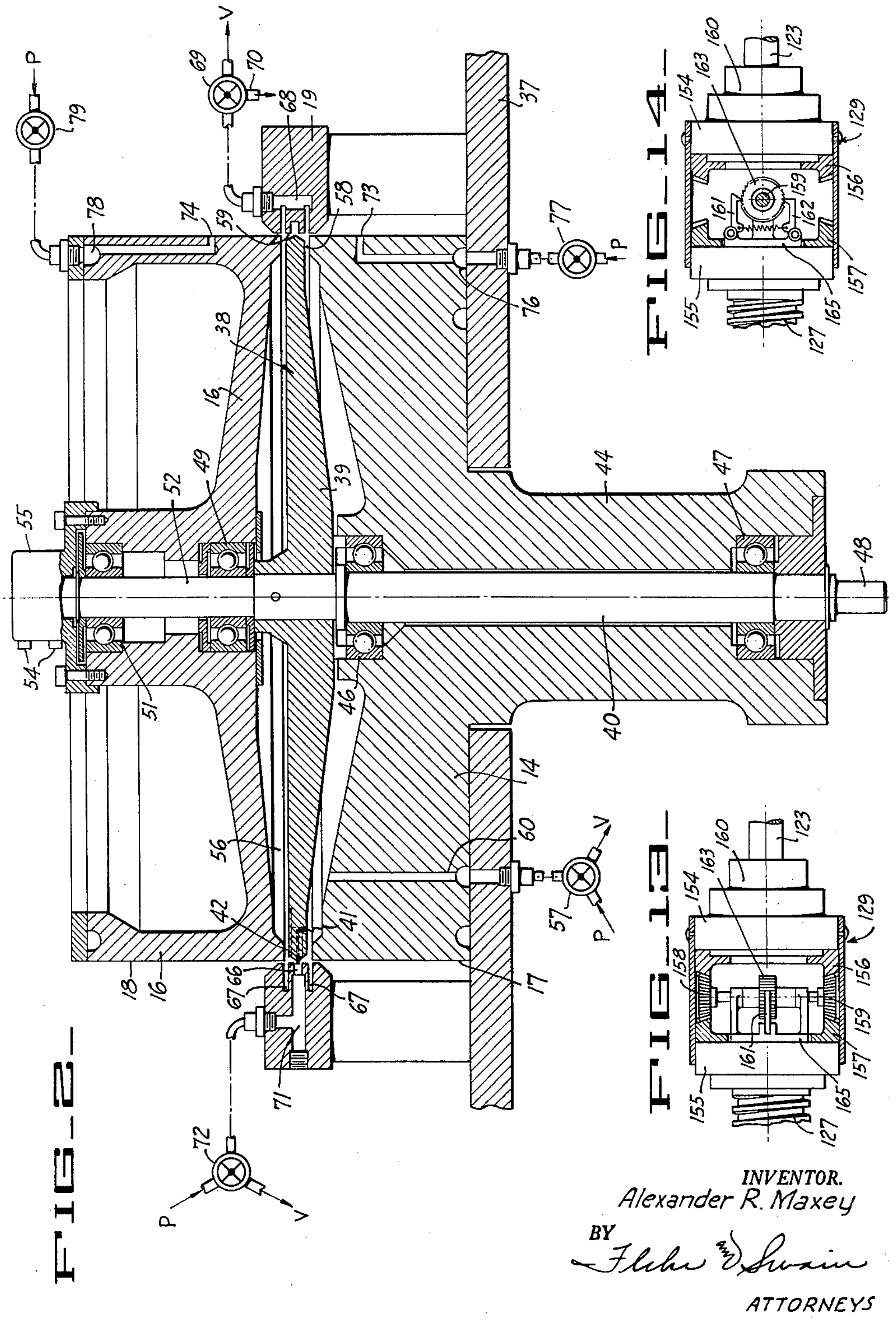
FIGURE 2 is a cross-sectional detail on an enlarged scale showing the guide means for the tape and the transducer assembly.
FIGURE 13 is a detail in section schematically showing one of the drive assemblies 129.
FIGURE 14 is a detail showing the ratchet means incorporated in the assembly of FIGURE 13.

FIGURE 2 shows one way in which the inner guides 14 and 16, and the outer guide means 19, can be mounted upon the top panel 37. Also this figure shows the relationship between the guide means and the rotary transducer assembly 38. The transducer assembly can consist of a rotary disc 39 formed of rigid material, and mounted upon the rotatable shaft 40. On the peripheral margin of the wheel 39 there is a transducer unit 41 which may be of the magnetic type, comprising a core of magnetic material provided with a winding, together with magnetic pole tips 42 separated by a small nonmagnetic gap. These tips project radially a short distance from the periphery of the disc 39 for contact with the tape. The transducer unit may be constructed in accordance with copending application, Serial No. 689,594, filed October 11, 1957.

The inner guide 14 can be fixed to the top plate 37. This guide together with the associated bearing sleeve 44, may carry the ball bearing assemblies 46, 47 for journalling the shaft 40. The exterior end 48 of the shaft 40 may be coupled to a suitable driving motor capable of driving the transducer assembly 38 at the desired speed.

For convenience, the inner guide 16 is carried by the bearing assemblies 49 and 51, mounted upon the shaft extension 52. Suitable means such as the detachable link 53 (FIGURE 1) can be attached to the guide 16, to prevent rotation.

The leads from the transducer unit can be extended through the shaft extension 52, to the slip ring assembly 55. Stationary terminals 54 of this assembly connect with an external signal circuit suitable for recording and reproducing operations. For the special purposes to be presently described, the space 56 between the guides 14 and 16 may be connected either to a source of pneumatic pressure above atmospheric, or a source of partial vacuum. Thus the duct 60 leading from this space is shown schematically as being connected through valve 57 with either a source of pressure, or a source of suction, both of which are capable of adjustment.

Shown in FIGURE 2, the peripheral margin of the disc 39, and also the transducer unit 42, operate within the annular slot 58 provided between the guides 14 and 16. The outer guide means 19 surrounds the slot 58 in close proximity with the outer surface of magnetic tape wrapped upon the peripheries of the inner guides. The inwardly faced peripheral surfaces 59 of the outer guide means 19 conform to a cylindrical surface having a diameter slightly larger than the diameter of the inner guides. The peripheral surfaces 59 are interrupted by the annular groove or recess 66, which is in alinement with the path of movement of the transducer tips 42, and by the annular grooves or recesses 67 that are located on opposite sides of the recess 66.

When the apparatus is in operation, pneumatic suction is maintained in the grooves 67 whereby the outer surface of the magnetic tape is held in contact with the peripheral surfaces 59. Thus groove 67 is shown communicating with the duct 68, which in turn is schematically shown connected through valve 69 with a source of suction, and an atmospheric vent 70. The source of suction is adjustable to the value desired. The recess 66 is also shown connected to either a source of pressure or suction. Thus a duct 71 connects through valve 72 to either a source of suction or pressure. This serves to control deflection of that portion of the tape which spans this recess, during normal operation. Application of pressure deflects the tape inwardly for pressure contact with the tips 42 of the transducer unit. Application of suction tends to cause outward deflection of the tape, with the result that the tape is held out of operating contact with the transducer unit. Application of suction or pressure to the space 56 serves substantially the same purposes as just described. If desired, the tape deflection can be controlled by controlling application of suction and pressure to both recess 66 and space 56, or if desired, suction and pressure can be applied to either one of recess 66 or space 56, in which event the other pneumatic control can be omitted.

Rubbing friction between the tape and the guides 14 and 16 preferably is minimized by using pneumatic floating. Thus the areas of the peripheral surfaces 17 and 18 over which the coiled portion of the tape extends is provided with a plurality of distributed openings 73 and 74. Openings 73 are shown connected to a common manifolding groove 76, which in turn connects to a source of pneumatic pressure through the valve 77. The holes 74 are similarly connected to the manifolding groove 78, which connects with a source of pneumatic pressure through the valve 79. With proper distribution of the holes 73 and 74, and application of a continuous flow of air or other gases under pressure, a film of air is maintained between the coiled portion of the tape and the rigid peripheral surfaces 17 and 18, whereby the tape can be moved in the direction of its length with a minimum amount of rubbing friction.

Figure 3:
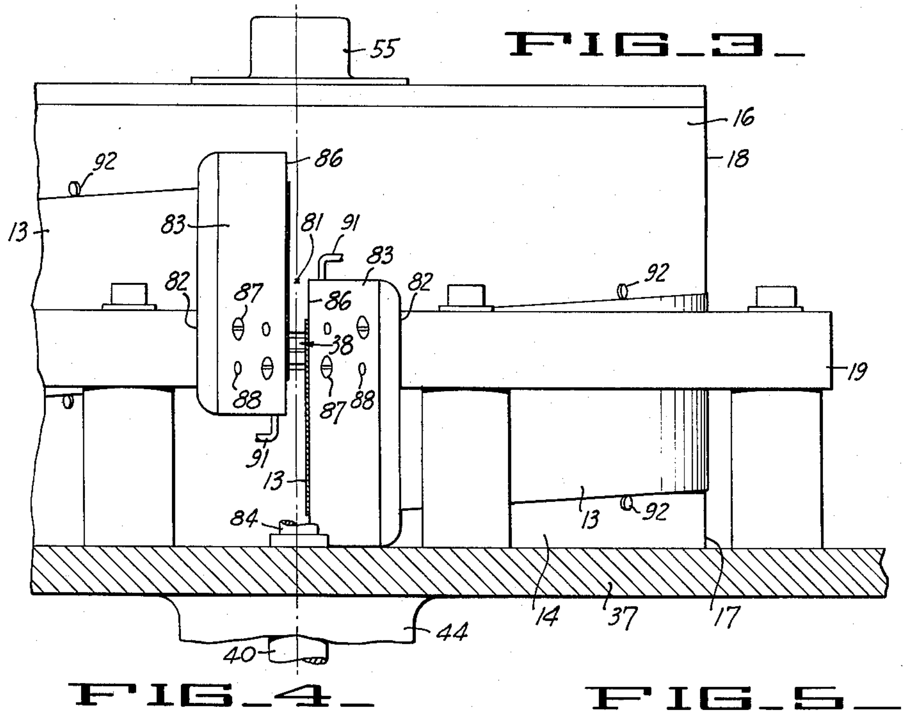
FIGURE 3 is a detail of an enlarged scale, partly in section, and showing a portion of the guide means where the tape enters and leaves the same.
Figure 4:
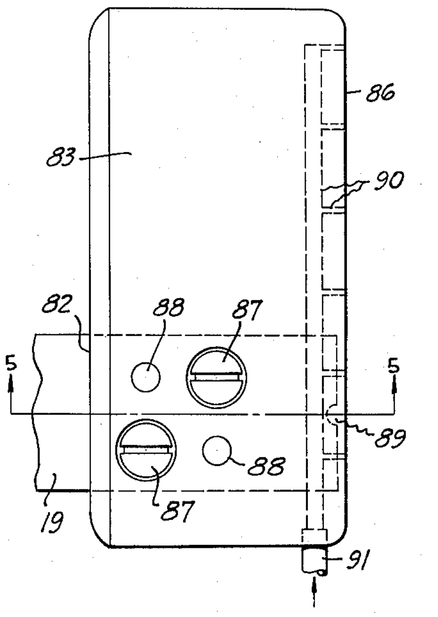
FIGURE 4 is an enlarged detail showing one of the guide means forming a part of the outer guide means.
Figure 5:
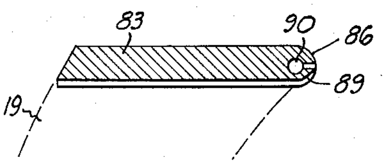
FIGURE 5 is a cross-sectional detail taken along the line 5—5 of FIGURE 4.

FIGURES 3, 4 and 5 show further details of the exterior guide means 19 and the supplement guides associated with the same. In general, the guide means can be constructed as a ring or annulus that is split to provide the tape access slot 81. The opposed end faces 82 are at an angle to each other (e.g. 90°) and serve to mount the guide plates 83. Each of these plates is provided with a rounded edge surface 86 over which the tape is bent, and is attached as by means of screws 87 to the main body of the annulus. Locating pins 88 serve to effect accurate positioning. In alinement with the path of movement of the transducer unit, each tape engaging edge 86 is provided with a small nick or depression 89, whereby in this region the tape may pass the transducer tips. The two guides plates project in opposite directions from the opposite sides of the guide means, in the manner illustrated in FIGURE 3.

It is desirable to provide the additional stationary guide devices over which the tape passes with pneumatic ducts and connections for securing pneumatic floating. Thus the stationary guides 32 and 33 and also the guides 34—36 can be provided with suitable openings and vents (not shown) connected with a source of pneumatic pressure. Likewise guide plates 83 have ducts 90 which are connected by tubes 91 to the same source of pneumatic pressure.

FIGURE 3 schematically illustrates how the tape is coiled upon the inner guides. Portions of the tape that are bent about the inner ends of the guide plates 83 are in relatively close apposition. Likewise, the pitch of the spiral is such that if the coiled tape portions were extended, they would overlap along an edge margin. Assuming that a magnetic tape is used having a width of the order of 2 inches, this projected overlap can be of the order of ½ inch, thus providing a tape width of 1½ inches for recording signal information.

Guide means is incorporated with the inner guides to prevent lateral or sidewise displacement of the tape during normal operation. Such guide means can consist of a plurality of circumferentially spaced studs 92 mounted upon the periphery of the guides 14 and 16. These guide studs engage one edge only of the coiled tape, and the corresponding edge of the tape is kept in contact with such guide means by virtue of the lateral component force created by friction between the transducer unit and the tape, when the apparatus is in operation. As illustrated in FIGURE 3, the transducer unit (not shown in this view) rotates counterclockwise as the apparatus is viewed in plan, whereby rubbing fricton between the tip of the transducer unit and the inner surface of the tape creates one force component tending to move the tape lengthwise, the second smaller force component tending to urge it against the guide studs 92.

Operation of my apparatus is as follows: Tape is coiled about the inner guides in the manner shown in FIGURE 3, and pneumatic pressure is applied through the valves 77 and 79 to float the tape upon the peripheral surfaces of these guides, whereby it may move endwise with a minimum of friction. Similarly, pneumatic pressure is applied to the stationary guides posts to secure pneumatic flotation. A predetermined amount of suction is applied through valve 69 to the grooves or recesses 67, whereby the tape is held in contact with the peripheral surfaces 59. It may be noted at this point that the back or reverse side of plastic magnetic tape is relatively smooth, and therefore offers very little friction to movement over a polished metal surface.

When a predetermined amount of pneumatic pressure is applied through valve 72 to the recess 66, the portions of the tape spanning this recess are deflected inwardly to contact the tips 42, thus establishing contact for recording and/or playback operations. The same effect can be had by venting recess 66 to the atmosphere, and by applying suction to space 56 through valve 57, or by applying both pressure to space 66 and suction to space 56. It may be explained at this point that under certain circumstances it is desirable to maintain the tape out of contact with the rotating transducer unit. Thus one may maintain the tape stationary, but permit the transducer unit to rotate, without however having the transducer unit contact the tape. Also, one may desire to keep the transducer unit out of contact with the tape during fast forward or reverse rewind operations. In the foregoing it is assumed that the tape is not contacted unless a pneumatic pressure differential is applied to the tape. When the apparatus is so constructed that contact occurs without such pressure differential, pressure can be applied to space 56 and suction to space 66 to prevent such contact.

Figure 6:
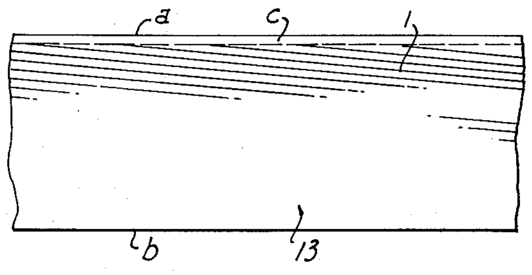
FIGURE 6 is a detail showing a portion of the magnetic tape and the manner in which the same is scanned by the transducer unit.

Assuming that it is desired to record signal intelligence, the tape is driven at a predetermined speed by the capstan 21. At the same time the transducer unit is driven at a predetermined speed to sweep across the tape along spaced successive tracks extending from one edge of the tape to the other, with the record track portions extending at acute angles to the edges of the tape. FIGURE 6 schematically illustrates the pattern of the record tracks upon the tape. It will be noted that the record tracks 1 extend at an acute angle to the tape edges *a* and *b*, leaving a margin *c* which can be used for other recording on tracks extending longitudinally of the tape, such as sound tracks, speed control tracks, etc. When used for television purposes, it is desirable for each record track portion 1 to contain sufficient video information to complete on picture field. In fact, with a tape of proper width, and by using inner guides of sufficient diameter, it is possible to record on one record track sufficient information for a complete video picture frame.

Figure 7:
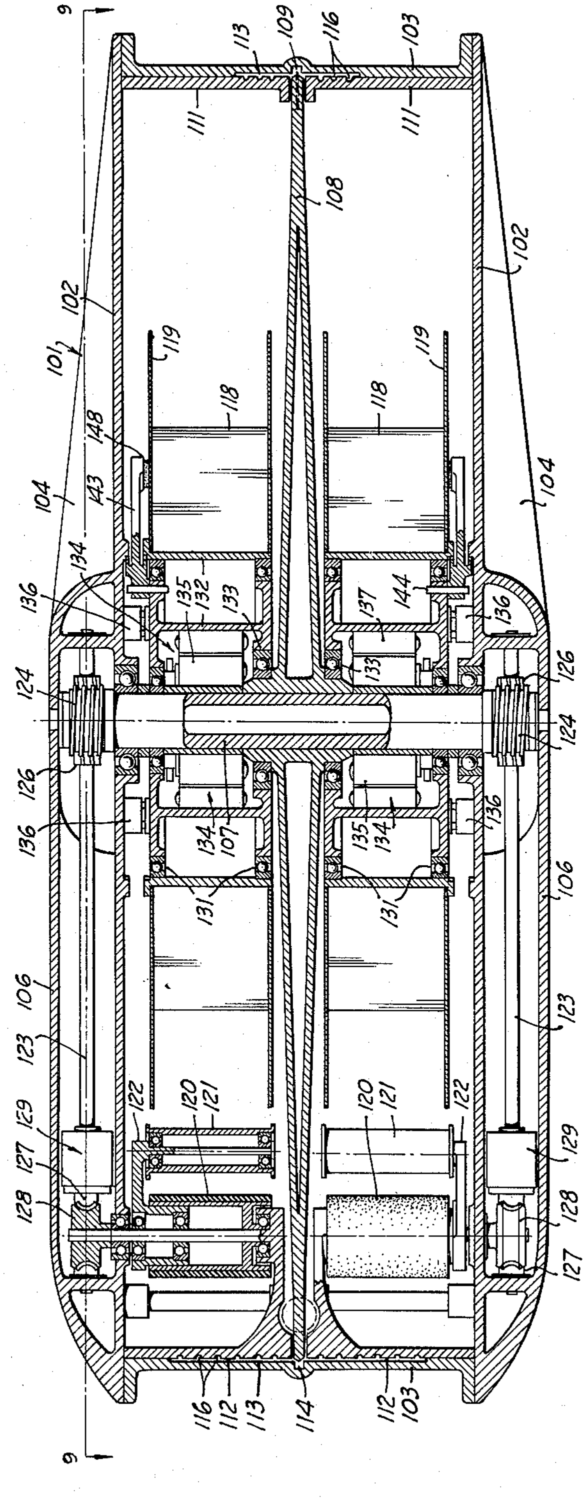
FIGURE 7 is a cross-sectional view showing another embodiment of the invention in which the tape reels are disposed within the guide means.
Figure 8:
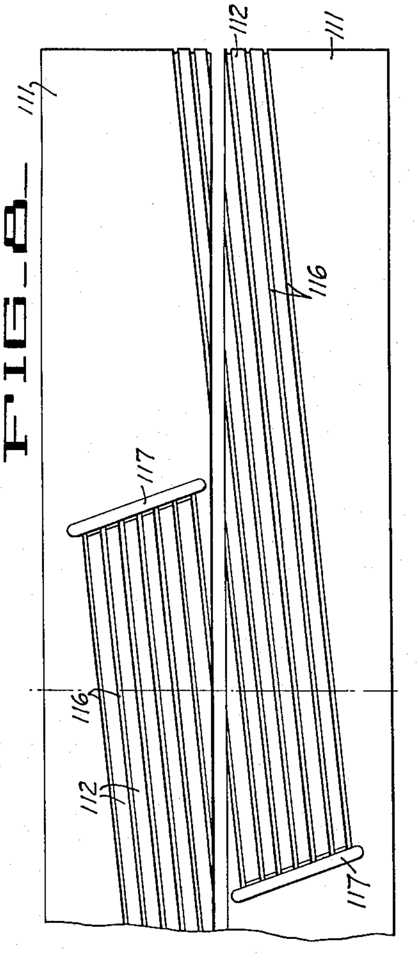
FIGURE 8 is a detail showing a portion of the guide means incorporated in the embodiment of FIGURE 7.
Figures 9, 10, 11:
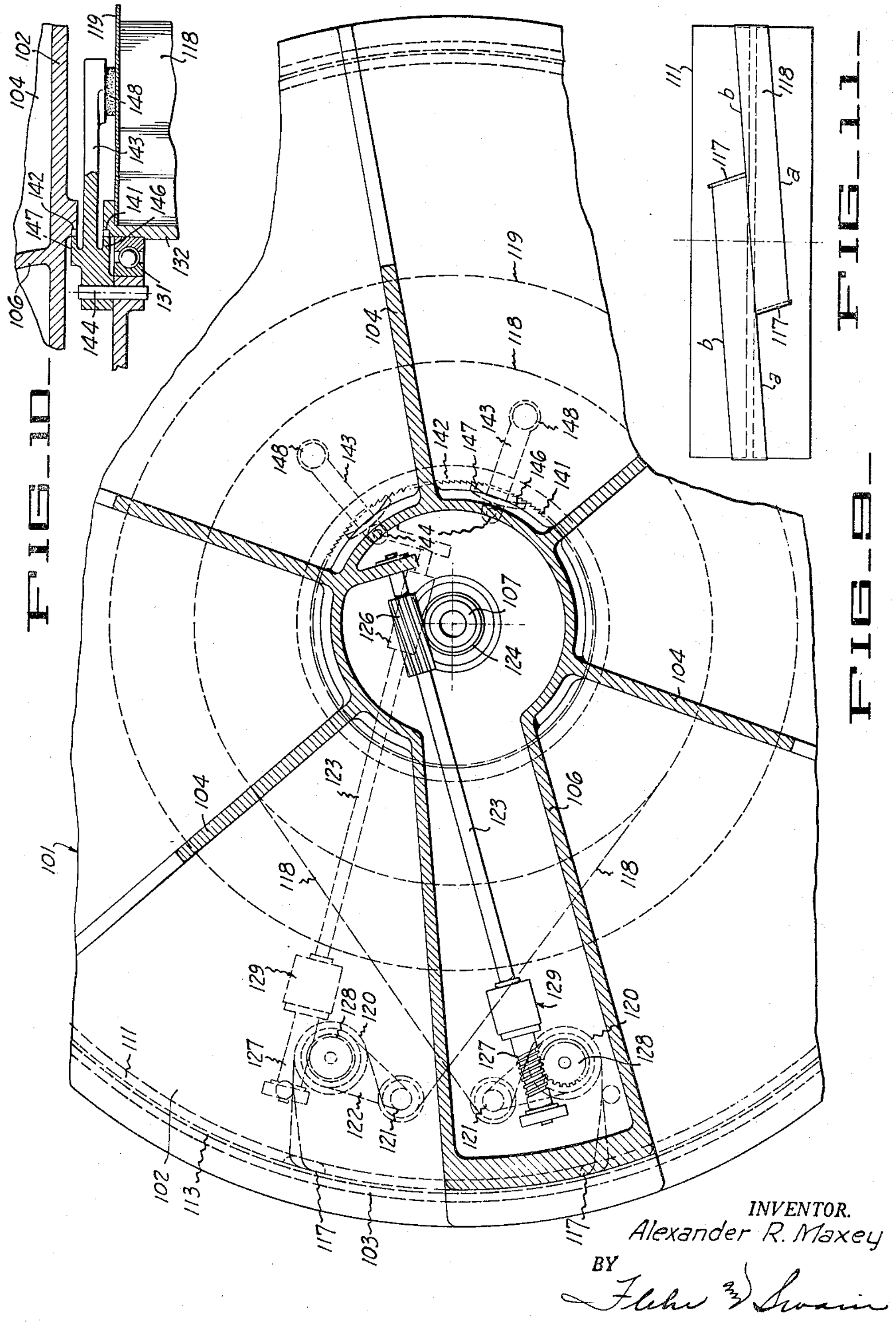
FIGURE 9 is a cross-sectional view taken along the line 9—9 of FIGURE 7.
FIGURE 10 is a cross-sectional detail illustrating automatic locking means in conjunction with the drive for the reels.
FIGURE 11 is a schematic view illustrating the manner in which the tape is spirally wrapped about the guide means.

FIGURES 7 to 11, inclusive, illustrate another embodiment incorporating some of the features described above. This embodiment is relatively compact and encloses all of the working parts in a single housing. Referring particularly to FIGURES 7 to 9, the apparatus in this instance consists of an outer housing 101 which includes the side walls 102, and a peripheral wall 103 conforming generally to a cylinder. The side walls as shown are provided with strengthening ribs 104, and with hollow portions 106 to house certain working parts. The external appearance is illustrated in FIGURE 7.

Within the housing there is a central rotatable shaft 107 which mounts the wheel or disc 108. A transducer unit 109, similar to the unit previously described, is mounted upon the peripheral edge of wheel 108, for contact with the magnetic tape. Stationary inner guides 111 are mounted within the housing wall 103, and these guides provide cylindrical surfaces 112 on their outer peripheries. The inner periphery of the housing wall 103 is recessed to provide the tape accommodating space 113, between the housing wall 103 and the inner guides 111. Also the housing wall 103 is formed to provide the inner recess 114, which is annular, and which is alined with the path of movement of the transducer unit 109. Both of the guide surfaces 112 are provided with helicoidally formed grooves 116, to assist in obtaining pneumatic floating action as will be present explained.

Tape access slots 117 are provided in the guides 111, in the manner illustrated in FIGURE 8. Somewhat more than one wrap of the tape is coiled about the guides 111, with the tape edges of the overlapping portions being in abutment. FIGURE 11 shows schematically the way in which the tape 118 is spirally wrapped about the guides. The tape in this instance has its edges *a* and *b* in abutting contact for the overlapping portions of the tape 118. Therefore with such an arrangement, the rotating transducer unit sweeps completely across the tape from one edge to the other.

Within the housing 103, and located on opposite sides of the wheel 108, I provide the tape reels 119. The two lengths of tape extending to these reels from the slots 117 engage the journalled drive capstans 120, and guide rollers 121 that are carried on the spring urged compliance arms 122.

The capstans are driven through gearing connected with the shaft 107. Thus shafts 123 are journalled within the hollow housing portions 106, and are operatively connected to the ends of the shaft 107, by the skew gears 124 and 126. The other ends of these shafts connect with the capstans through the worm gears 127 and gears 128. Both shafts are interrupted by solenoid operated differential drive assembly 129. Each such assembly is provided with windings adapted to be energized by controlling pulses to either interrupt or establish a driving connection between the shaft 107 and one or the other of the capstans. Also each assembly has a winding and ratchet stepping means, whereby the phase relationship between the capstan and shaft 107 can be adjusted.

The tape reels 119 are journalled by bearing assemblies 131 with the annular shells 132, which in turn are rotatably carried by the bearing assemblies 133, on the main central shaft 107. Electric motors 134 are provided, with each motor having an inner part 135 mounted upon the shaft 107, and an outer part 137 mounted upon the shell 132. Windings of these motors connect to external energizing circuitry through slip ring assemblies 136. When energized these motors develop torques tending to cause rotation between the inner and outer parts.

Locking means is provided between each shell 132, the associated casing wall 102, and the associated reel. Thus annuluses 141 and 142 are attached respectively to one of the tape reels 119 and the adjacent housing wall 102, and are provided with oppositely faced teeth. Locking lever 143 is pivoted at 144 to the side of the corresponding shell 132, and is provided with pawls 146 and 147 for engaging the teeth on the annuluses 141 and 142 respectively. The free end 148 of lever 143 forms a friction pad which has rubbing contact with the adjacent side of the corresponding reel 119. Depending upon the positioning of lever 143, engagement of the pawls 146 and 147 with the toothed annuluses 141 or 142, causes the corresponding shell 132 and the corresponding motor part 135 to be locked to either the associated reel, or to the housing.

Operation of the apparatus shown in FIGURES 7 to 11, inclusive, is as follows: For movement of the tape in one direction the motors are separately excited to develop torques in the same direction. However, one motor, say the uppermost of the two motors shown in FIGURE 7, has its outer part locked to the housing by engagement of pawl 147 with the toothed annulus 142. Therefore the inner part of this motor applies torque to drive the wheel 108 at the desired speed. The inner part 135 of the other motor likewise applies some torque to the shaft 107 to drive the wheel. However, its outer part 137 is locked by engagement of the corresponding pawl 146 with the annulus 142, whereby the outer motor part 137 becomes locked to the associated reel 119 to drive the same in a direction to wind up the tape. Applying torque to both motors in a reversed direction reverses the direction of movement of the tape, and applies rotation to the other reel to take up the tape.

One of the driving capstans 120, namely that capstan which draws the tape from the exterior of the guides 111 to the interior of the housing, is rotated by energizing one of the windings of the associated assembly 129. As a result, the tape is moved continuously from the supply reel through the corresponding slot 117, then in a helicoidal path about the guides 111, to eventually be withdrawn through the other slot 117 and delivered to the takeup reel. While the tape is moving the transducer unit 109 is sweeping over the tape along separate record tracks in the manner previously described. Assuming that edges of the tape are in abutment between the slots 117, the record tracks extend completely from one edge of the tape to the other. If desired, the tracks can be made of such length that edge margins of the tape can be erased and utilized for the recording of additional information, such as the vertical blanking interval in the case of video frequencies, a control frequency for use in controlling the driving of the motors, a sound or monitor track, or the like. Windage created by movement of peripheral edge of the wheel 108 between the guides 111 causes sufficient air pressure to be exerted upon the inner side of the coiled tape to cause pneumatic floating action, thus permitting the tape to move over the peripheral surfaces of the guides 111 with a minimum amount of rubbing friction.

Figure 12:
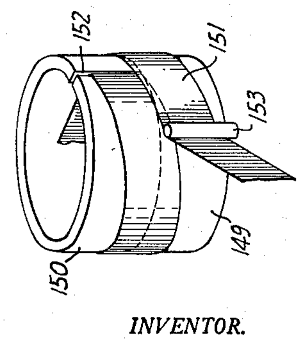
FIGURE 12 is a schematic view illustrating another embodiment in which the spirally wrapped tape has overlapping margins.

In the foregoing, two configurations have been described for the coiled tape. Another configuration is shown in FIGURE 12. In this instance the two inner guides 149 and 150 are shown with tape 151 wrapped about the same. The guide 150 has an access slot 152 through which the tape extends to associated guide means. At the other end of the coil the tape passes over the guide post 153. The pitch of the helicoid is such that marginal edges of the tape overlap between the slot 152 and the post 153. In this arrangement the transducer head passes across the overlapping margins. It has the advantage that no erasing operation is required to make a margin of the tape available for further recording, and time lapse between successive record tracks is reduced to a minimum. Likewise the overlapping margins facilitate movement of the transducer unit from the end of one record track to the beginning of the next.

Each differential assembly may be made as shown schematically in FIGURES 13 and 14. The parts 154 and 155 enclose solenoids, the electrical leads to which may extend through shafts 123 and 127 from slip rings (not shown). These parts also carry aligned ring gears 156 and 157, which are engaged by sun gears 158 that are carried by a common shaft 159. A member 160 is reciprocated by energizing the solenoid part 154. Oppositely acting pawls 161 and 162 are pivotally carried by member 165 and are spring urged against a ratchet wheel 163 that is fixed to shaft 159. When solenoid part 155 is recurrently energized, the angular (i.e. phase) relationship between shafts 123 and 127 is changed step by step. The part 154 includes a solenoid and clutch operated by the same whereby shaft 123 can be declutched with respect to the mounting of ring gear 156. When so declutched shaft 123 is free to rotate without rotating shaft 127.

In some instances, it may be desirable to use two rotary transducer units instead of one, with the two units displaced 180° and arranged to track over the same tape areas. The second head can be connected to a separate reproducing circuit to obtain monitoring playback simultaneously with recording.

In the foregoing I have described the use of pneumatic floating to reduce friction. Friction can also be reduced by making guiding surfaces from materials like Teflon, which provide a self lubricated effect.

In general my invention can be used for a wide variety of applications, where it is desired to record the maximum amount of information on a given length of tape. Particularly it can be employed for the recording and/or reproduction of signal frequencies over a wide frequency spectrum, such as the conventional composite video signal.

I claim:

1. In magnetic tape apparatus, a tape guiding and transducer assembly comprising axially alined inner guides presenting contiguous cylindrical peripheral surfaces of equal diameters, said surfaces being axially spaced to provide an annular slot therebetween, said surfaces being adapted to receive a helicoidally coiled length of pliable magnetic tape, a rectilinear area of the coiled tape that extends at an acute angle across the tape being exposed through said slot, a rotatable transducer unit operating in said slot to sweep over said area of the tape, outer guide means embracing said inner guides in the region of said slot and providing inwardly faced cylindrical surfaces in spaced proximity with the first mentioned peripheral surfaces, said outer guide means having an annular recess spanned by the coiled tape and generally alined with said slot, and pneumatic means for selectively causing that portion of the tape spanning said slot to be held out of contact with the transducer unit or to be contacted by the same.

2. Apparatus as in claim 1 in which the peripheral surfaces of the outer guide means on both sides of said recess, are provided with grooves or recesses, together with means for applying pneumatic suction to said last named grooves or recesses to retain the tape in contact with said surfaces.

3. Apparatus as in claim 1 together with means for driving the tape in the direction of its length, and means abutting one edge only of the tape for guiding the same.

4. In a magnetic tape apparatus, a tape guiding and transducer assembly comprising axially alined inner guides having contiguous cylindrical peripheral surfaces of equal diameters, said surfaces being axially spaced to provide an annular slot between the same, said surfaces being adapted to receive a helicoidally coiled length of pliable magnetic tape, a rectilinear area of the coiled tape extending at an acute angle to the edges of the tape being exposed through said slot, a rotatable transducer unit operating in said slot to sweep over said rectilinear area, pneumatic means for continuously supplying a film of gas between the tape and said peripheral surfaces, whereby said tape is capable of lengthwise movement about said guide members with minimum friction, abutment means on at least one of said inner guides engaging one edge only of the tape and serving to prevent displacement of the tape laterally of its length, and means engaging the tape for driving the same in the direction of its length.

5. Apparatus as in claim 4 together with outer guide means embracing said inner guides in the region of said slot, said outer guide means having peripheral surfaces adapted to contact the exterior surfaces of the coiled tape, and pneumatic means for causing that portion of the coiled tape spanning said slot either to be urged into contact with the transducer unit or held out of contact with respect to the same.

References Cited in the file of this patent

UNITED STATES PATENTS

| | | |
|---|---|---|
| 1,707,243 | Wildhaber | Apr. 2, 1929 |
| 2,314,834 | Kiel | Mar. 23, 1943 |
| 2,612,566 | Anderson et al. | Sept. 30, 1952 |
| 2,747,025 | Selsted | May 22, 1956 |
| 2,773,120 | Masterson | Dec. 4, 1956 |
| 2,919,314 | Holt | Dec. 29, 1959 |

FOREIGN PATENTS

| | | |
|---|---|---|
| 877,210 | Germany | May 21, 1953 |